INVENTORS
ROBERT D. MORROW
& ANDREW S. HEGEMAN

BY Hurvitz & Rose
ATTORNEYS

INVENTORS
ROBERT D. MORROW
& ANDREW S. HEGEMAN

BY Hurwitz & Rose
ATTORNEYS

United States Patent Office 3,405,232

Patented Oct. 8, 1968

3,405,232

VIDEO TAPE RECORDER USING AMPLITUDE MODULATED CARRIER AND SATURATED TAPE

Robert D. Morrow, Baltimore, Md., and Andrew S. Hegeman, Glen Ridge, N.J., assignors to Par Ltd., Clifton, N.J., a limited partnership Filed May 28, 1965, Ser. No. 459,711
8 Claims. (Cl. 178—6.6)

ABSTRACT OF THE DISCLOSURE

A video tape recording system, in which a magnetic tape is pre-polarized to D.C. saturation in one sense, after which the moving tape is subjected to a carrier wave, amplitude modulated by the video signal and by a D.C. polarization signal operative in the same sense as the original bias signal.

The present invention relates generally to the recording and reproduction of intelligence bearing signals, and more particularly to apparatus for magnetically recording and reproducing wide band signals, such as video, at moderate record-reproduce scanning speeds.

In one of its most advantageous forms, the present invention is embodied in a video tape recorder and reproducer especially adapted for use in the home with commercial television receivers. However, while the ensuing description emphasizes such use, it will be understood by those skilled in the art, upon consideration of this description, that the present invention and the principles underlying its operation are similarly applicable to the recording and reproduction of any wide band signal, such as may be employed in telemetering systems; to the storage and retrieval of information in and from the memory units of computer systems; and, generally, to any application in which it may be necessary or desirable to compress large quantities of information into physically small dimensions for storage, with substantially no loss of quality upon subsequent retrieval and reproduction.

Apparatus suitable and appropriate in the performance of such operations, and which is at once efficient, relatively uncomplicated and inexpensive, is obviously highly desirable. It is a primary object of the present invention to provide such apparatus. More specifically, it is an object of the present invention to provide innovations and improvements in the field of recording and reproduction of wide band signals.

In one embodiment, the present invention comprises a system for recording associated video and audio information signals on separate tracks of a single magnetic tape of the type conventionally used for home audio entertainment. For example, the audio information may be recorded on one track of the video information (the standard composite video signal containing: synchronizing pulses, blanking pulses and picture information as transmitted to and received by home television receivers) on a second track of a standard quarter inch wide, four track magnetic tape at moderate tape scanning speeds, say 30- or 60-inch per second speed. At the 30-inch per second speed, a standard reel of 4800 feet of such tape will record 32 minutes of program material in each direction, i.e. 64 minutes in all, quite suitable for moderate speed recording in the home.

In the most customary prior art magnetic recording procedure, the desired signal is mixed with a bias signal, generally relatively high frequency, although other A.C. bias, and sometimes D.C. bias has been employed, and recorded on initially magnetically neutral or demagnetized tape. The bias signal functions to position the desired, i.e.

information-bearing, signal along a linear portion of the tape transfer characteristic, to reduce distortion to tolerable levels. Recorded signals are erased to return the tape to the neutral or demagnetitzed condition, so that new signals may subsequently be recorded.

The reasons underlying the use of A.C. or D.C. biasing in magnetic recording processes, primarily the achievement of operation within a linear portion of the tape transfer characteristic, are well known in the art, as are the principles upon which each conventional biasing technique is based. Reference is made, for example, to Begun, "Magnetic Recording" (Murray Hill Books, 1949) pp. 54 et seq. for a brief qualitative discussion.

In a less conventional prior art recording procedure, the magnetic tape is saturated in one direction prior to the application thereto of magnetization signals in the form of audio frequency signals amplitude modulating an H-F carrier. Such an arrangement is shown in U.S. Patent 1,886,616 to Alverson. Briefly, as explained in Alverson, after the tape passes through the saturation heads the induction drops to a retentivity value which is still along the saturated portion of the B–H curve. Hence, when the amplitude modulated H-F carrier flux is applied to the tape via recording heads disposed further along the tape path, those half cycles of carrier flux bounded by one side of the modulation envelope which are of a polarity tending to magnetize the tape in the same direction as that in which it is already saturated, are effectively rejected. Subjection of the tape to unmodulated half cycles of carrier flux of the opposite polarity establishes an operating point (pre-selected, of course) substantially centrally located along a linear portion of the tape transfer characteristic (i.e. a demagnetization of the tape), so that these latter half cycles of modulated carrier demagnetize (or more apt, desaturate) the tape to record a signal thereon which is substantially a replica of the initial audio signal. In this manner, the presaturation of the tape effects demodulation of the carrier, to permit the recording of the desired audio signal exclusively, in the form of high frequency carrier components. The advantage of this high frequency method of recording audio signals is said to lie in the reduction of distortion ordinarily caused by significant variations in the recording characteristics of the tape with relatively wide variations in the audio frequencies of interest.

Since an effective carrier for such purpose would require a frequency of some 10 or more times the highest audio frequency to be recorded (Alverson, for example, sets the carrier frequency at 50 kc. for an upper limit of approximately 5,000 cycles for the audio range), and since video signals of interest lie within a frequency range of approximately 0–4 mc., it goes without saying that a similar procedure is impractical for the recording of video signals. That is, Alverson amplitude modulates the high frequency carrier wave with the audio frequencies desired to be recorded and reproduced to gain the advantages of uniformity of recording properties of the tape at the higher (carrier) frequency; but the problems of providing a carrier wave of similarly high frequency (e.g. 40–50 mc.), relative to the video band, and of applying such frequencies to conventional magnetic recording tapes are practically insurmountable in the present state of the art.

Similarly, in U.S. Patent 2,734,941 to Zenel, it is noted that the use of A-C bias (not to be confused with a carrier wave for modulation purposes, as described above), fine for the recording of signals in the audio or "super-audio" ranges, is unsuitable for its usual function, as previously stated of achieving a more linear transfer characteristic as well as positioning the desired signal information along the linear portion of the characteristic where video signals are to be recorded. The superimposing of such A-C bias, at the normal frequency of several times the highest signal frequency to be recorded, on the signal information is certainly not readily accomplished, for reasons which are set forth in Zenel, viz. cost, complexity and inefficiency of even the most fundamental apparatus required.

In Zenel it is proposed that the magnetic recording of video signals be accomplished with D-C bias. Briefly, according to Zenel, the tape is saturated in one direction after which the wideband video signals are recorded, including the D-C component of the signals impressed on the tape at a specified operating point set by a D-C bias on the recording transducer. Here, the pre-saturation of the tape is stated to be purely for the purpose of overcoming the non-linear characteristic normally present in magnetic tape, whether in pristine or pre-recorded state, so that a greater portion of linearity in the characteristic curve, and hence a greater dynamic range, may be possible. The D-C bias, which is actually provided concurrently by a D-C current applied to the recording transducer and by re-insertion of the D-C component of the video, lost in the electronics, at a point in the circuit just prior to the transducer to establish the D-C level of the video within the linear portion of the characteristic, is employed as a "fine" setting for the static and/or dynamic operating point on the characteristic curve.

In accordance with the present invention, the magnetic tape is pre-polarized to D-C saturation in one direction or sense, after which the moving tape is subjected to a highly focused flux field generated by a recording transducer to which is applied a carrier wave, amplitude modulated by the video signal which is to be recorded and subsequently reproduced, and a D-C polarization signal, in the same direction as the initial saturation. We have found that such a system permits the highly successful recording of video signals as broadcast by commercial television stations, and subsequent reproduction of the signals for display on a standard commercial television receiver, in quality equaling that which can be obtained by direct display of the received video signals.

The reasons for this successful operation are not altogether clear, since although low frequency recording theory is well established, the same is not true for high frequency recording theory, the boundary line between low and high frequency for purposes of the present discussion being approximately 100 kc. It is fairly clear, however, that acceptable levels of non-linear distortion are much higher for video signal recording than for audio frequency recording. That is, for video recording a wide dynamic range of signal linearity is unnecessary, being expensive and difficult to achieve without any likelihood of obtaining corresponding benefits. Several discrete levels or steps of linearity are perfectly adequate to provide desirable fidelity, that is, accurate reproduction of the broadcast signal. We have not, therefore, been overly preoccupied with attempts to accomplish substantially unattainable results relative to levels of linearity and distortion in the recording process. Rather, our efforts were directed toward the achievement of recording resolution close to the theoretical absolute limit, with accompanying high frequency response; high sensitivity, i.e. the recording of extremely low level signals; and elimination or substantial reduction of noise components to improve signal-to-noise ratio (*S/N*). These efforts have resulted in realized accomplishment, with unexpected dividends in better linearity and lower distortion than had been anticipated. Briefly, these accomplishments were attained in the following manner. The magnetic tape, prior to recording of the desired signal, is subjected to D-C polarization or bias, as via conventional erasing head structure, for producing a magnetizing force $H_s$ of sufficient level to cause saturation in a predetermined direction. After passage of the tape through the erasing head the magnetic induction in the tape will, at this point, decrease along the B–H curve to a value of remanence which may be less than the normal retentivity value $B_R$, i.e., less than full saturation.

The video signal to be recorded for subsequent reproduction, derived for example from the video detector of a standard commercial television receiver, in the frequency range of, say, 0–6.5 mc., is employed to amplitude modulate a carrier having a frequency approximately equal to the highest video frequency to be recorded, 6.5 mc. in this example. Hence, the carrier cannot properly be termed high frequency relative to the modulating signal, in this case. This produces a lower sideband in the same frequency range as the modulating signal itself, and requires cancellation of the modulating signal prior to application of the modulated carrier to the recording transducer. Of course, the fact that the modulating signal frequencies approach the frequency of the carrier means that some loss of definition will occur for the higher video frequencies in the band, but this is not serious since resolution of recorded signal for present day tapes has an upper theoretical limit of approximately the same frequency. Therefore, the carrier frequency may be increased to some extent as the state of the recording media art achieves new levels.

The carrier oscillator function also becomes important at this point. The loss of definition at the high end is compensated for by the fact that a square wave is generated instead of a conventional sine wave, thus increasing the available geometric area of electrical operation or reaction to a piece of information occurring at lower than fundamental oscillation frequency.

This technique is fundamental and a prerequisite to obtaining linearly without pre-emphasis of the high frequency response in the recording system.

The recording transducer is arranged, in a manner to be described presently, to provide a highly focused magnetic field for the recording of signals on the tape as the tape passes therethrough. The modulated carrier applied to the recording transducer results in a magnetizing signal of repetitive half cycles of modulated carrier in both the same direction and the opposite direction relative to the direction of saturation of the tape. As in Alverson, mentioned above, the tape operates effectively to detect the modulating signal as those half cycles of carrier in the opposite direction of polarization demagnetize the presaturated tape in accordance with the shape of the modulation enveloped bounding the half cycles. We have found, however, that substantial improvement in sensitivity is obtained if the successive demagnetizations of the tape, according to the modulation envelope shape, are each followed by a retun to full saturation, i.e. to the magnetic induction value $B_R$. In such a case, the "zero" level is the D-C saturation level, rather than, as in Alverson, the demagnetization level of the tape produced by the presence of unmodulated carrier. To maintain the "zero" level or operating point at D-C saturation, it is required that a small D-C polarization current, in the direction of saturation and of a level sufficient to restore the tape to saturation between the recorded demagnetizations, be appled to the recording transducer in addition to the modulated carrier. Thereby, the moving magnetic tape is subjected to successive pulses, at a repetition frequency equal to the carrier frequency, and each desaturating the tape by an amount equal to the modulating signal value for the pulse, resulting in effective rectification of the modulated carrier by the saturated tape itself. The D-C polarization or magnetization, derived from the low level direct current applied to the recording head supplementing the recording flux corresponding to the modulated carrier, assures that each pulse of recorded signal is "clamped" to the same starting point, that is, on operating point along the saturated portion of the tape transfer characteristic, e.g. corresponding to $B_R$.

The tape is thus subjected to magnetization, in a direction opposite that in which it is saturated (hence, an effective de-magnetization or desaturation), by constant frequency components of modulating signal (video information), rather than being subjected to magnetizing forces at frequencies throughout the video band covering approximately 0–6.5 mc. The latter is the direct recording of the video signal, for example as described in Zenel, which introduces severe problems of frequency compensation, loss of senstivity, and radical decreases of reproduction intensity and signal-to-noise ratio. The former, on the other hand, produces a relatively narrow range of rate of change of flux to be recorded and reproduced, since the carrier can be viewed as effectively chopping the video signal at a regular rate into pulses of substantially uniform width and variable amplitude. While at the frequency involved there will occur slight loss of definition when conventional audio tapes are employed, this is readily overcome by skill of the recording art techniques applied to tapes and recording heads upon consideration of certain relevant factors as will be discussed presently. Unlike Alverson, it will be observed that we have found that the use of high frequency carrier relative to frequencies of modulating signal is not a requirement for video recording, and indeed, would otherwise create serious problems because of present day recording component capabilities at the frequencies of interest in video tape recording. Moreover, we have found that placing the operating point at the saturation level of the transfer characteristic results in substantial improvement in recording sensitivity and in reduction of noise components. The modulation is further effective to increase linearity and to lower distortion, apparently because the carrier acts also in a manner similar to that of an A-C bias.

A possible explanation for the remarkable results we have obtained in recording and reproduction of video information in the aforementioned manner, with quality of reproduced video display corresponding quite closely to that of direct video display, is as follows. We emphasize, however, that no claim is made for the validity or accuracy of this particular explanation, except that it is based upon high frequency recording theory, to the extent that theory is presently established, and upon certain of the data compiled in our testing program. We are, at this point, able to state with assurance only that our results far exceed any of which we are aware in the video tape recording field, as applied to the type of unit herein considered, i.e. especially suitable for recording of video directly from standard commercial television receivers. Proceeding then with an explanation which has been deduced from our results, our experience has indicated that if the signal is recorded at too high a level, subsequent to D-C saturation of the tape, the residual polarization of the recording medium tends to decrease to a value below the saturation level whereupon a significant part of the desired effect is lost as indicated by an increase in noise components or loss of high frequency components, or both. We found that the desired effect could be restored by restoration of the dynamic operating point along the tape transfer characteristic to the saturation level. Initially, this was attempted by pulsing or "flashing" the recording head with D-C polarization pulses during the recording operation but this method was found to be undesirable because of complexity and relatively rapid loss of residual magnetism by the recording head. The continuous application of a low level D-C bias to the recording head, however, resulted in a substantial increase in recording sensitivity. The improved sensitivity may be accounted for by noting that the steepest portion of the hysteresis loop occurs along the descending part of the curve from the point of magnetic remanence $B_R$. Conventional tapes, especially those for recording short wave length signals, may demagnetize below $B_R$ because of field interactions between the particles of magnetic material in, for example, the iron oxide coating. In any event, a combination of phenomena including presence of eddy currents, skin effect, tape speed, etc. exert a substantial, perhaps controlling, effect on the loss of residual magnetism in the desired direction and consequent reduction in sensitivity. The continuous D-C bias on the recording head apparently operates to overcome whatever controlling effect is exerted by these phenomena, at least to a sufficient extent to restore the magnetic induction (steady-state or quiescent) of the tape to $B_R$ at which sensitivity is greatest in the descending direction. This bias, occurring within the focused field at the recording transducer, exercises a continuing dynamic control over the recording of the desired signal by effecting a return to saturation level at the same point for each high frequency (carrier) component of the signal.

The initial D-C saturation as applied by the erase heads prevents any further effect on the state of magnetism of the tape for A-C signals in the same direction as that of D-C polarization, but permits the recording of A-C signals in opposition to the D-C reduction or reversal of magnetization. In the latter case, the magnetization of the tape varies with the carrier frequency downwardly (i.e. in a direction of descendency along the most sensitive region of the transfer characteristic) from the initial saturation level by an amount proportional to signal (video information) level. If flux density were plotted on a graph versus time and the average amplitude marked for each cycle of the carrier the locus of these points establishes the signal recorded, and reproduced. For an ideal pick-up head, or reproducing transducer, a strong response to the recorded signal is manifested. Moreover, the playback or reproducing system requires no carrier detection apparatus since the tape itself operates as a demodulator, as previously explained.

If, during recording, the signal is maintained at sufficiently low level that signal magnetization of the tape is confined to a very thin layer of magnetic coating, on the order of one micron (40$\mu$ inches=1$\mu$ (micron)), the theoretical absolute limit of resolution for recording would appear to be approachable, and, in fact, has been approximately observed in our tests. In principle, the maximum frequency which can be recorded is limited by length of recording gap and tape speed, as well as by particular tape characteristics, e.g. size and orientation of magnetic particles.

In accordance with the above discussion, it is a broad object of the present invention to provide a novel system of magnetic recording.

It is another object of the invention to provide a relatively simple, efficient, and inexpensive video tape recorder appropriate for use in the home with conventional commercial television receivers, for recording at moderate tape speeds.

It is another object of the invention to provide a system of magnetic recording employing focused magnetic recording fields by means of gapped heads, the fields having smaller widths at the recording medium than exist in the gaps.

It is still another object of the invention to provide a system of magnetic recording in which D-C bias is employed and in which the D-C bias is re-inforced directly at a record head, as a means of increasing record sensitivity and increasing signal to noise ratio.

A further object of the invention resides in the provision of a system for recording pulsed video signals, the pulses having a frequency at least as great as the highest video frequency desired to be recorded, and being unidirectional as viewed on the recording medium.

It is still a further object of the invention to provide a system for creating a recording signal from a video signal, where the video signal has a maximum frequency $f$, by amplitude modulating the video signal in a balanced modulator on a carrier having a frequency at least approximately equal to $f$, whereby the video signal is eliminated by the balanced modulator, and feeding the modulated carrier into recording circuitry having high attenuation for frequencies above the carrier frequency.

Still another object of the invention is to record a video signal on a magnetic medium in the form of high frequency DC variations of magnetic intensity of one polarity, with respect to a DC magnetic bias, whereby the video signal may be directly derived from the medium without heterodyning or formal detection.

One serious problem in video tape recording, is in the provision of precisely uniform tape feed. This feature is accomplished according to the present invention by feeding tape over a drag tension flywheel. This expedient of itself, provides perfectly uniform speed of tape feed.

It is an object of the invention to provide a novel system of tape feed at uniform velocity, by feeding the tape over a drag tension flywheel.

The above and still further objects, features and attendant advantages of the present invention will become apparent from a consideration of the following detailed description of one specific embodiment thereof, especially when taken in conjunction with the accompanying drawings in which.

Figure 1:
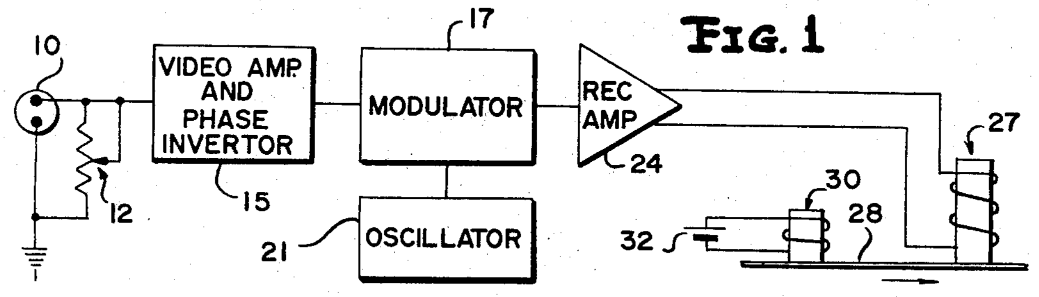
FIGURE 1 is a circuit diagram partially in schematic and partially in block diagrammatic form, of the recording system in accordance with the present invention.

Referring now to the drawings, FIGURE 1 illustrates a simplified circuit diagram of a video tape recording system in accordance with the present invention. As noted above, the recording system may include conventional audio recording apparatus associated with one track of the multi-track tape, so that the audio signal matching the picture information may be simultaneously recorded therewith, i.e., in corresponding sound and picture tracks.

In addition, provision may be made for stereophonic treatment of the audio signal for reproduction of the prerecorded video tape. Since arrangements and provision for the recording and reproduction of audio signals are completely conventional and form a part of a well publicized art, no attempt will be made here to go into any detailed discussion or description of such matter. It is sufficient to note that these conventional arrangements and devices may be included or not in association with apparatus in accordance with the present invention, as desired, and that such association is deemed to be within the skill of the art and, hence, within the purview of this invention.

The video information is applied to the recording system via an input terminal 10, the latter shunted by a video level adjusting potentiometer 12. The adjusted level video is fed to a video amplifier and phase inverter, shown as a single unit 15, and the output of the latter thence to a modulator 17 wherein the video signal derived at this point amplitude modulates a carrier having a frequency corresponding or close to the highest frequencies present in the video signal. The carrier is obtained from an oscillator 21 having an output terminal coupled to an input terminal of modulator 17.

The carrier wave, amplitude modulated by the video information, as appearing at the output terminal of the modulator, is applied to a recording amplifier 24 capable of developing the signal voltage levels necessary to drive the recording transducer 27. The head of transducer 27 is in intimate contact with the magnetic recording surface of the recording medium such as tape 28.

The tape is rendered movable relative to the recording transducer by any conventional transport mechanism, such as a suitable drive motor (not shown) operatively coupled to the tape take-up reel. The tape itself may be of substantially conventional form such as a plastic non-magnetic backing strip (e.g., Mylar) on which is deposited a magnetic coating or layer including a multitude of infinitesimal iron oxide needle particles in a supportive substrate. The coating may be relatively thin for purposes of video recording since the useful recording depth at the higher frequencies is on the order of 50 micro inches. In a practical embodiment, a quarter-inch wide tape having four magnetic tracks (audio standard), two in each direction of tape travel, was employed for the simultaneous recording of video and matching audio information as transmitted to and received on a conventional home television receiver. The synchronizing pulses, blanking pulses and picture information contained in the standard composite video signal (NSTC standard) was recorded on one track and the audio signal on the other, for each direction of travel. In this manner a standard seven-inch reel of tape (4800 feet) provided 32 minutes of program material in each direction, or 64 minutes in all, at 30-inch per second tape speed. Similarly, a 10½ inch reel of tape (9600 feet) provides the same program time at 60-inch per second tape speed. The recording system may also be adapted to handle color signals, by using all four tracks in a single direction, resulting, of course, in a reduction by one-half of the program time for any given length of tape.

It is to be emphasized that the tape dimensions, type and composition indicated above are purely illustrative, such tapes having been employed in one series of successful tests but being collateral to the novel structure and operation of the system and portions thereof as described herein. It is to be expected that other suitable recording media are presently available and that, as advances are made in the information recording and storage medium art, improved tapes for this purpose will be available in the future.

Returning now to the description of the recording system shown in FIGURE 1, a further transducer 30 is disposed in contact with the tape at a point along its path of travel preceding the location of recording transducer 27. Transducer 30 is employed to produce a unipolar magnetic flux sufficient to bias or polarize the magnetic coating of the tape to a point of saturation along the tape transfer characteristic. In a suitable arrangement for such purpose, transducer 30 may comprise a standard erase head to which a DC current is applied from a unidirectional voltage source 32. Alternatively, a permanent magnet structure capable of generating sufficient magnetizing force to cause saturation may be employed. The magnetic or electromagnetic configuration of the polarizing head is not critical so long as the width of the saturated channel of the tape corresponds to or approximates the width of the pole piece of the recording head.

As tape 28 traverses biasing or polarizing transducer 30, the magnetic particles in the tape coating or film are oriented in accordance with the polarity and character of the magnetizing force H applied thereby. If the tape is initially in a magnetically neutral state, the particles are oriented in perfectly random fashion or distribution, or, if the tape is prerecorded, in a fashion corresponding to the instantaneous character of the magnetizing force imposed by the recorded signals. Upon subjection to the unipolar saturating bias of the erase head, however, the particles assume a substantially vertical orientation with poles arranged in accordance with the polarity of the bias. Bipolar DC and AC biasing, on the other hand, produce longitudinal and lateral particle orientations, respectively.

We have found that the vertical particle orientation permits, in conjunction with other phenomena described herein, the recordation of video signals in a manner which will give highly accurate reproduction upon playback. It appears that the longitudinal or lateral particle orientations are undesirable because, in the former instance, of an exaggerated inertial movement occurring with increasing signal frequency and decreasing signal amplitude, and, in the latter instance, of inadequate response to pulses of high frequency, fast rise time, and short duration. The vertical orientation on the other hand, seems to have minimum particle inertia, maximum particle isolation, and to be especially responsive to signal polarity.

Figure 6:
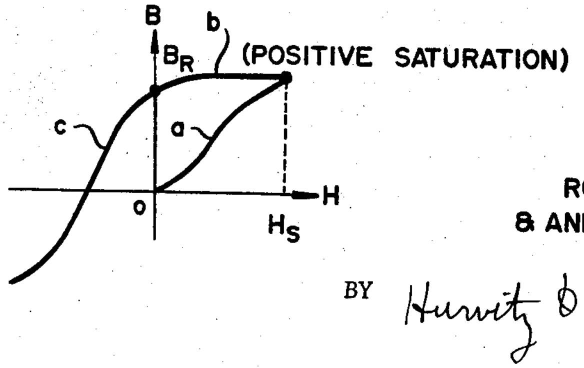
FIGURE 6 is a typical hysteresis loop of magnetizing force versus magnetic induction.

The vertical particle orientation is readily visualized by reference to the B–H curve (FIGURE 6). Assuming the magnetic medium to be in an initially neutral state, i.e. particles in random orientation, at the origin O of the B–H coordinates axes, a unidirectional magnetizing force $H_S$ applied by the erase head drives the medium into saturation, following path *a*. At this point all elements are vertically oriented, and as the tape moves progressively along the path toward the recording head, those particles which are no longer under the influence of the steady polarizing flux will tend, because of the internal elemental field contributions, to become oriented in a slightly offset (from vertical) position. Thus, the magnetic induction of the medium falls off along path *b* to the value $B_R$ and, unless subjected to magnetizing forces of opposite polarity, will remain in the saturated state at that level. Any further application of magnetic bias or signal in the direction of the saturation polarity (here assumed positive) will have no meaningful effect on the medium. Opposite polarity signal, however, will drive the medium, at the point of application, to a new state of magnetic induction along the path *c*, proportionally to the signal level over the linear portion of the curve.

Figures 2, 3:
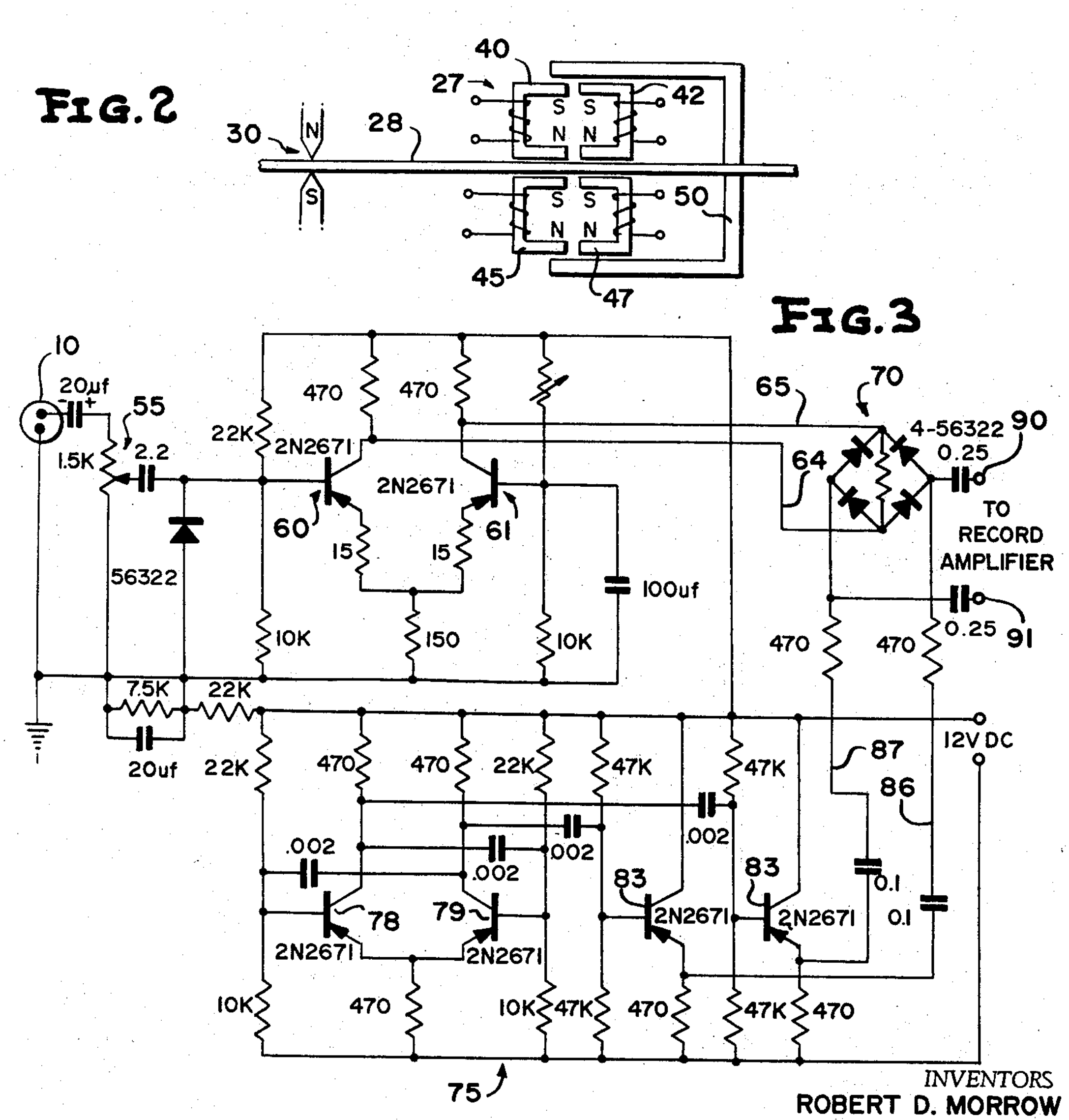
FIGURE 2 is a more detailed view of the recording transducers.
FIGURE 3 is a detailed schematic diagram of a portion of the recording circuit of FIGURE 1.

Referring now to FIGURE 2 DC bias, in the form of unidirectional saturating flux, is applied to tape 28 by any conventional magnetic or electromagnetic structural configuration, subject to limitations as to width of saturated channel noted above. In FIGURE 2, such structure is shown in mechanical schematic representation as oppositely disposed north-south poles between which the magnetic tape 28 moves in proceeding toward the recording transducer 27. Transverse particulate element orientation is thus uniformly achieved by subjecting the tape to a strong, preferably extremely narrow field, such that very little longitudinal diffusion of the flux along the tape is permitted.

Recording transducer 27 has been empirically found to be best embodied in a north-north and south-south polar configuration provided by the placement of electromagnets 40, 42 and 45, 47 in like pole-to-like pole opposition on either side of the tape, respectively, and in intimate contact therewith. The flux return path is substantially confined within the boundary established by a magnetically permeable element 50. Such a recording head configuration provides a highly desirable focused field, the lines of flux through the tape being concentrated in an area which is narrower at the recording surface than are the gaps of the electromagnets at either side of the tape. It is to be emphasized that it is the highly focused field, rather than the particular recording head configuration, which is desirable.

For short wave recording at the frequencies of interest (3–4 mc.), the heads should be formed of extremely thin laminations, on the order of 2 mils for example, of Mu Metal such as Hi Mu 80 to prevent significant eddy current problems. Recording gaps of from 10 to 30 μinches have been found to be feasible. The theoretical absolute limit of the resolution for a recording gap of approximately 10 μinches and signal magnetization to a depth of probably no more than 50 μinches calculates to a response of some 100,000 wave lengths (cycles) per inch times 60 inches per second tape speed, which equals approximately a 6 mc. limit of recording. We have observed frequency response at greater than 4 mc.

Our experience has indicated that optimum fidelity is obtained and observed on playback and display if, during the recording operation, the recording transducer is slightly magnetized, i.e. slightly DC biased, rather than neutral. A possible explanation for the behavior of the recording system in this regard has been offered earlier in this specification. In any event, the presence of a slight residual magnetism obtained by "flashing" the head with a DC voltage source, in a direction corresponding to the orientation of the original magnetic bias on the tape after passage through the unidirectional flux field of the erase head, has been found to significantly increase the recording sensitivity. A low level DC current, in the same direction as the "flash" current, is maintained during the recording operation. Similar results may be achieved by the application of a constant or substantially constant DC current to the recording head throughout the recording operation, without resort to "flashing." Alternatively, a practical head structure may include a small permanent magnet across the rear gap of the head laminations to produce this desirable unidirectional bias. It has been found necessary to provide a similar bias on the playback head; although in those tests wherein such bias was employed during playback and repeat playback, there was no observable decrease in signal-to-noise ratio nor any erasure of recorded signal.

Referring now to FIGURE 3, there is illustrated one specific circuit arrangement, exemplary rather than limiting, which has been successfully employed for the modulating function in the circuit of FIGURE 1. The input signal at terminal 10 may be obtained from an emitter follower circuit bridged at the video detector of a standard television receiver or from the camera video signal output in a closed circuit system.

The video signal level is adjusted by means of a potentiometer 55 and thence applied to a video amplifier and phase inverter comprising a pair of PNP transistors 60, 61, coupled to provide a balanced push-pull output at leads 64, 65 to bridge modulator 70. Single ended circuitry may alternatively be employed, but the balanced push-pull signal provides greater linearity and amplitudes without overload.

It is customary in most modulating systems to use the low frequency signal information to modulate a considerably higher frequency carrier. Amplitude modulation of an R-F carrier by an audio signal, for example, may readily be accomplished to provide suppression of the modulating signal and an output containing only carrier and sideband energy. In the present system, however, the information signal (video) has a bandwidth of, say, 30 cycles to 3.5 mc., so that modulation of a 4 mc. carrier therewith will produce a lower sideband in the same range as the modulating signal itself. In order to suppress the latter a balanced modulator, for example diode bridge modulator 70, is employed, with the requirement that the modulating signal input (at leads 64, 65) be balanced.

This requirement is met by feeding the single ended video input through the emitter coupled transistor video amplifier and phase inverter comprising transistors 60 and 61. Such a circuit offers the advantage of gain in addition to providing equal driving impedances for each signal phase as viewed by the modulator.

The carrier signal input to modulator 70 is provided by a high frequency multivibrator 75 comprising a pair of transistors 78, 79. The multivibrator operates as a simple but reliable push-pull oscillator, generating a 4 mc. carrier waveform, for example, having an excellent square wave shape. As previously explained, the square waveform increases linearity and compensates for some loss of definition at the higher frequencies in the band. Each side of the multivibrator is coupled to a separate respective transistor 81, 83, each arranged in emitter follower configuration to provide balanced low impedance drive to modulator 70 as well as to provide effective isolation for the multivibrator. Balanced outputs to the bridge appear at leads 68 and 87.

For linear modulation at high modulation percentages and for avoidance of clipping and compression of modulation peaks, it is desirable to apply a slight DC bias to the modulating bridge. The bridge output at leads 90, 91 comprises a 4 mc. double sideband AM signal which is applied to the record amplifier as shown in FIGURE 4.

Figures 4, 5:
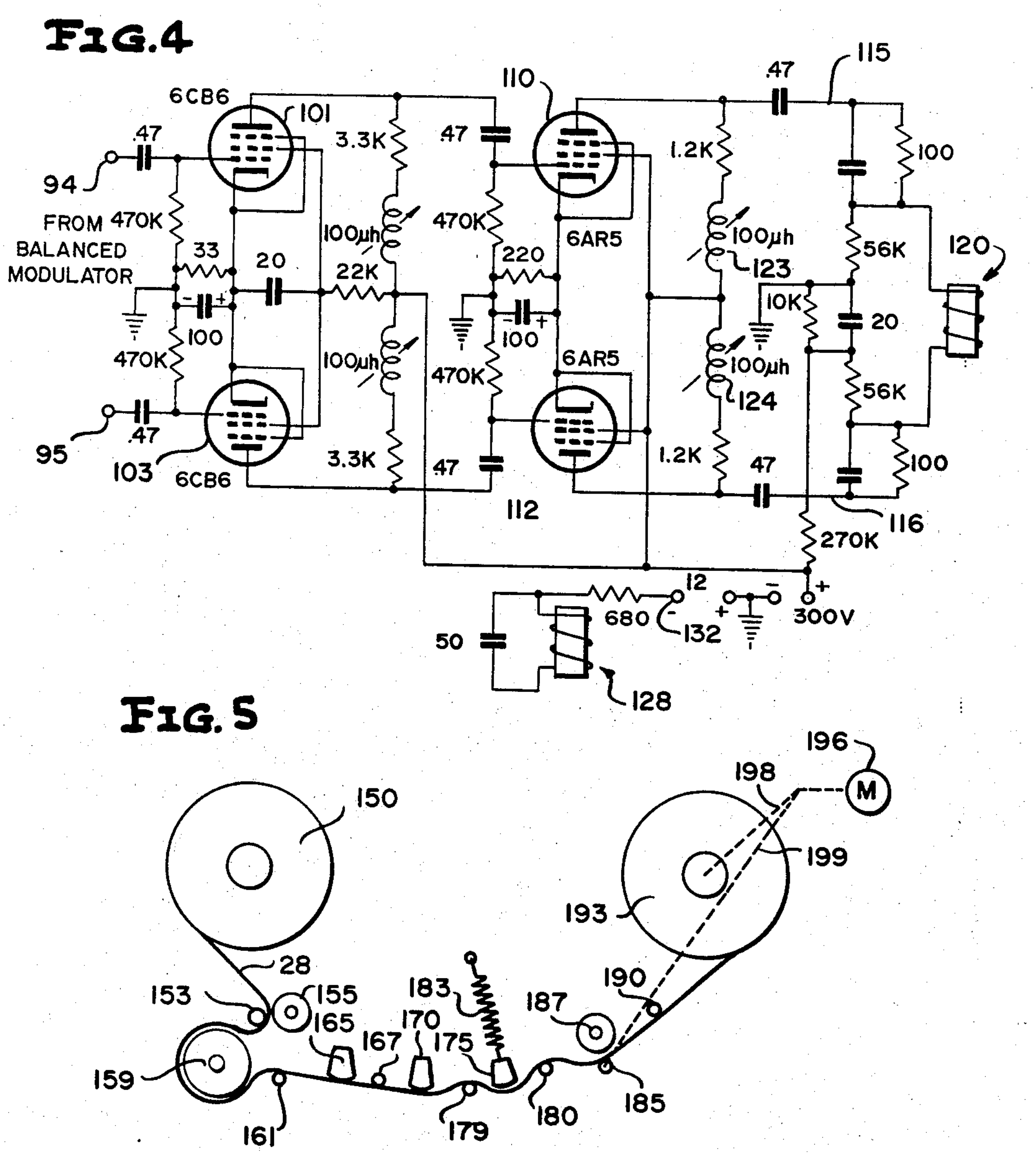
FIGURE 4 is a detailed schematic diagram of a further portion of the recording circuit of FIGURE 1.
FIGURE 5 is a mechanical schematic of a tape feed arrangement in accordance with the present invention.

Referring now to FIGURE 4, the record amplifier (24 of FIGURE 1) is a push-pull two stage pentode amplifier capable of developing the signal voltages necessary to drive the recording transducer. The first pentode section comprising tubes 101 and 103 is employed to provide voltage gain and is shunt peaked to increase bandwidth. Leads 90 and 91 of FIGURE 3 are coupled respectively to leads 94 and 95 of FIGURE 4, through which the double sideband AM signal is applied to pentodes 101, 103. The second pentode section, including tubes 110, 112, is capacitively coupled to the recording transducer, here illustrated as a simple record head 120, via leads 115 and 116, respectively. Each of the latter two pentodes is inductively fed through small variable plate inductances 123, 124, rather than conventional resistances, to compensate for high frequency record head losses and to match the inductive reactance of the head windings. The required DC bias is obtained from a direct voltage source, here illustrated as a 300 volt source although the DC current through the recording head will be slight, owing to resistance in the head winding path.

Electrically, the recording transducer, illustrated for example in greater detail at 27 of FIGURE 2, is very low impedance (3–4 ohms) at low frequencies compared to more conventional structures. At the carrier frequency, however, its impedance is significant (approximately 30,000 ohms at 4 mc. in one model), thus requiring substantial driving voltages. Such voltages are readily obtained from the record amplifier, which is a completely linear unit. A relatively short low capacitance cable may be required to keep the natural parallel resonance of the output circuit above the carrier frequency.

For purposes of clarity and convenience, the erase head is shown in schematic form, at 128 of FIGURE 4, as an electromagnet driven by a DC voltage source connected to terminal 132. As previously noted, however, a strong permanent magnet structure may be provided in its stead. In further connection with both FIGURES 3 and 4, it is to be emphasized that the component types and values shown are illustrative rather than limiting, and that other circuit configurations may be employed subject to certain limitations and/or desirable features which have been set forth above.

Although the output of the modulator is, in this example, a double sideband amplitude modulated signal, the natural filtering action of the final sections of the recording system, caused by such factors as high frequency head losses, tape losses and impedance variations with frequency transfer, is effective to substantially reduce the upper sideband energy relative to the lower sideband. Hence, the system approaches and operates substantially as a single sideband or vestigial sideband system.

Referring now to FIGURE 5, there is illustrated an arrangement for providing a smooth running, constant tension tape line for medium speed (such as 30- or 60-inch per second) high frequency recording and/or playback in accordance with the present invention.

The tape 28 leaves feed reel 150, which may or may not be provided with back tension, but preferably has neither dynamic nor mechanical braking, and is fed between a guide post 153 and a pressure pad 155. The pad is operative to maintain a relatively uniform back pressure on the tape irrespective of the loading on feed reel 150.

Tape 28 proceeds about the periphery of a damping and drag tension flywheel 159, possessing high inherent inertia and rotating upon low friction bearings. Flywheel 159 thus rotates at a speed which is dictated by tape tension and other factors along the tape line, such as tape thickness, oxide coating, tape lubricating qualities and so forth. In this manner, any variations in tape tension or speed occurring at the feed reel side of the line are unobserved at the heads.

The tape proceeds about a first main guide 161, and thence across a face of DC erase head 165, about a second main guide 167, and across the face of an audio record head 170. As previously noted, the audio signal is recorded on a separate track of the multi-track tape.

In the embodiment shown in FIGURE 5, the video record/playback head 175 is arranged to swing in an oscillatory fashion, under the control of vibratory driving means (not shown), between a pair of guides 179, 180. The purpose of such an arrangement is to permit the playback of single frame video from a stationary or slowly-moving tape, and may be provided or not as desired. That is, a fixed video head may be employed in the illustrated embodiment without loss of any of the smooth motion, uniform tension characteristics of the tape transport line. Where the swinging head is used, however, guides 179 and 180 are so positioned at either side thereof that intimate contact is continuously maintained between the tape (which may be moving or stationary) and the parabolic face of the oscillating head. Moreover, the head, being spring loaded by spring 183, is useful in damping out transients otherwise manifested in the form of wow and flutter and in maintaining resonance at a fixed frequency to provide maximum swing at the desired frequency.

From the video head, the tape moves progressively between a capstan 185 and rotatable pressure or puck wheel 187, past the last main guide 190, and upon the take-up reel 193. At start-up, drive is applied simultaneously to the take-up reel and to capstan 185, via motor 196 and associated power trains 198, 199, as puck wheel 187 is engaged, to provide both smooth starting and elimination of strain on the tape as it is wound about the take-up reel. In one series of tests, using apparatus as shown in FIGURE 5, measured time from start up to full speed ranged from 250 to 500 milliseconds, depending upon tape factors noted above.

While we have illustrated and described a particular embodiment of our invention, it will be understood that various changes and modifications in the various details of structure and operation so illustrated and described may be resorted to without departing from the spirit and scope of the invention. It is therefore desired that the present invention be limited only by the appended claims.

We claim:

1. Apparatus for recording video information derived from conventional television broadcast signals on a magnetic storage medium, said apparatus comprising means for generating a carrier having a frequency approximately equal to the highest frequency in the video information to be recorded, means responsive to said video information for amplitude modulating said carrier therewith, means for unidirectionally magnetically saturating said storage medium, recording transducer means responsive to the modulated carrier for impressing a record representative of said video information on said saturated storage medium, and means for uniformly returning said storage medium to unidirectional saturation between impressions of said video information-representative record thereon.

2. Apparatus for recording the video information contained in a standard television broadcast signal from a conventional television receiver, said apparatus comprising means responsive to the video information derived by said receiver for amplitude modulating therewith a carrier signal having a frequency substantially corresponding to the highest frequency in said video information, recording transducer means for applying magnetizing forces representative of the modulated carrier to a unidirectionally pre-saturated magnetic recording medium, and means for D-C biasing said transducer means for maintaining the magnetic level of said recording medium, from which said magnetizing forces are effective to produce a record of said video information, at the level of unidirectional saturation.

3. A video tape recorder for storing video information derived from standard television broadcast signals on a magnetic tape, comprising a recording transducer for imposing magnetizing forces on said magnetic tape in accordance with electrical signals applied thereto to produce a record representative of said signals on said tape; transport means for moving said tape in a predetermined path; D-C transducer means disposed along said path for unidirectionally saturating the moving tape prior to said imposition of magnetizing forces thereon by said recording transducer; means for generating a carrier signal having frequency on the order of the highest frequency contained in said video information; means for amplitude modulating said carrier signal with said video information to produce electrical signals representative of said video information; means for applying said electrical signals to said recording transducer; and means for unidirectionally biasing said recording transducer to maintain the response of the tape to said magnetizing forces at said unidirectional saturation level.

4. The combination according to claim 3 wherein said means for amplitude modulating includes a balanced modulator responsive to said carrier signal and to said video information for generating said electrical signals; and wherein said means for applying said signals to said recording transducer includes a linear recording amplifier responsive to the electrical signals generated by said balanced modulator and having an output reactance selected to match the inductive reactance of said recording transducer, whereby to provide an effective recording current drive to said transducer.

5. In a system for recording on a magnetic recording medium video frequency signal derived from television signals, said video frequency signal including picture information, synchronizing pulses and blanking pulses, the combination comprising means for unidirectionally saturating said medium, means for chopping said video frequency signal at a rate on the order of the highest frequency contained therein to generate a series of pulses each of amplitude proportional to the level of that portion of said video frequency signal from which it is derived; recording transducer means responsive to said pulses for impressing upon said medium magnetic signals proportional to the level of said pulses in a polarity opposite to that of said unidirectional saturation whereby to record said video signal on said medium; and means for clamping said pulses at a fixed D-C level so that said video signal recording is uniform relative to an arbitrary substantially constant reference level.

6. A video tape recorder, comprising a recording transducer for impressing magnetizing forces on a magnetic tape in accordance with electrical signals applied thereto to produce a record representative of said signals on said tape; means for driving said tape in signal recording relation relative to said recording transducer; means for unidirectionally saturating said tape prior to said impression of magnetizing forces thereon by said recording transducer; means responsive to standard television broadcast signals for deriving video information therefrom; means for chopping said video information at a rate on the order of the highest frequency contained therein to generate a series of pulses wherein the amplitudes of successive ones of said pulses are representative of said video information; means for applying said pulses to said recording transducer for impressing upon said medium magnetic signals proportional to the level of said pulses in a polarity opposite to the polarity of said unidirectional saturation, so that said video information is recorded on said medium; and means for maintaining the recording of the video information relative to an arbitrary constant reference level.

7. In a recording system for use in conjunction with a conventional television broadcast receiver to record on a moving presaturated magnetic signal storage medium video signals derived from commercial television broadcast signals by said receiver, means for varying a preselected amplitude characteristic of a signal of frequency adjacent the highest frequency of said video signal in accordance with the information contained in said video signal, recording transducer means responsive to said characteristic-varied signal for generating magnetic signals proportional to the varying characteristic for storage on said presaturated medium whereby the stored signal is available for subsequent playback to reproduce and display said video information, and means for biasing said recording transducer means to clamp the recorded signal at a fixed reference level.

8. A tape recorder for storing the video signal component of standard television broadcast signals on magnetic tape for subsequent reproduction and display, comprising means for unidirectionally presaturating said tape, means for generating a high frequency signal, means for varying a preselected amplitude characteristic of said high frequency signal in accordance with the information carried by said video signal component, means responsive to said varying-characteristic high frequency signal for impressing magnetizing forces representative thereof on said presaturated tape in a direction opposite to the direction of presaturation, and means for clamping the signal recorded on said tape in response to said magnetizing forces at the unidirectional saturation level.

References Cited

UNITED STATES PATENTS 2,734,941 2/1956 Zenel.
3,084,224 4/1963 Sanford.

ROBERT L. GRIFFIN, *Primary Examiner.*

H. BRITTON, *Assistant Examiner.*